US012573728B2

(12) United States Patent
Park et al.

(10) Patent No.: US 12,573,728 B2
(45) Date of Patent: Mar. 10, 2026

(54) BATTERY PACK HAVING CURRENT BLOCKING DEVICE USING BIMETAL AND OPERATING METHOD THEREOF

(71) Applicant: LG ENERGY SOLUTION, LTD., Seoul (KR)

(72) Inventors: Min Hee Park, Daejeon (KR); Sang Jun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 849 days.

(21) Appl. No.: 17/791,503

(22) PCT Filed: Aug. 2, 2021

(86) PCT No.: PCT/KR2021/010080
§ 371 (c)(1),
(2) Date: Jul. 7, 2022

(87) PCT Pub. No.: WO2022/030919
PCT Pub. Date: Feb. 10, 2022

(65) Prior Publication Data
US 2023/0335871 A1      Oct. 19, 2023

(30) Foreign Application Priority Data

Aug. 7, 2020      (KR) ........................ 10-2020-0099179

(51) Int. Cl.
*H01M 50/581*      (2021.01)
*H01M 50/213*      (2021.01)
(Continued)

(52) U.S. Cl.
CPC ....... *H01M 50/581* (2021.01); *H01M 50/213* (2021.01); *H01M 50/505* (2021.01); *H01M 50/566* (2021.01); *H01M 2200/101* (2013.01)

(58) Field of Classification Search
CPC ............. H01M 50/581; H01M 50/213; H01M 50/505; H01M 50/566; H01M 2200/101;
(Continued)

(56) References Cited

U.S. PATENT DOCUMENTS

| | | | |
|---|---|---|---|
| 4,112,201 A | | 9/1978 | Mabuchi et al. |
| 5,903,423 A | * | 5/1999 | Okano ................ H01M 50/574 361/87 |

(Continued)

FOREIGN PATENT DOCUMENTS

| | | |
|---|---|---|
| CN | 101517781 A | 8/2009 |
| CN | 109565024 A | 4/2019 |

(Continued)

OTHER PUBLICATIONS

First Office Action dated Sep. 9, 2023, issued in corresponding Chinese Intellectual Property Office for CN App No. 202180008465. X.

(Continued)

*Primary Examiner* — Matthew T Martin
*Assistant Examiner* — Bartholomew A Hornsby
(74) *Attorney, Agent, or Firm* — Morgan, Lewis & Bockius LLP

(57)      ABSTRACT
The present disclosure relates to a battery pack and an operation method thereof. The battery pack includes a pack case, a plurality of cylindrical battery cells in the pack case, and a current breaking device in the pack case to connect the plurality of cylindrical battery cells and having a portion including a bimetal. The current breaking device includes a fixed end contacting an electrode terminal of the cylindrical battery cell, a free end contacting an electrode terminal of the surrounding cylindrical battery cell, and a flexible member configured to elastically press the free end toward the surrounding cylindrical battery cell. The battery pack may (Continued)

include a current breaking device using bimetal that is capable of quickly restoring a connection with a surrounding cylindrical battery cell when a state of a battery cell separated from the surroundings in case of an abnormal state thereof is recovered.

13 Claims, 3 Drawing Sheets

(51) Int. Cl.
H01M 50/505 (2021.01)
H01M 50/566 (2021.01)

(58) Field of Classification Search
CPC .. H01M 50/502; H01M 50/572; H01M 50/20; H01M 50/50; Y02E 60/10
See application file for complete search history.

(56) References Cited

U.S. PATENT DOCUMENTS

| | | | |
|---|---|---|---|
| 2010/0047674 A1 | 2/2010 | Ryu et al. | |
| 2013/0306353 A1* | 11/2013 | Zhao | H01M 50/553 |
| | | | 174/133 B |
| 2015/0064517 A1* | 3/2015 | Han | H01M 50/507 |
| | | | 429/61 |
| 2017/0179462 A1 | 6/2017 | Bourns et al. | |
| 2019/0109313 A1 | 4/2019 | Ryu et al. | |
| 2019/0237713 A1 | 8/2019 | Seol et al. | |
| 2019/0363334 A1 | 11/2019 | Motokawa et al. | |
| 2020/0127337 A1 | 4/2020 | Kim et al. | |
| 2020/0144574 A1 | 5/2020 | Bae et al. | |
| 2020/0227697 A1 | 7/2020 | Cummins et al. | |

FOREIGN PATENT DOCUMENTS

| | | | |
|---|---|---|---|
| CN | 110663122 A | | 1/2020 |
| DE | 102016221096 A1 | | 4/2018 |
| JP | H03214559 A | | 9/1991 |
| JP | 2005-174814 A | | 6/2005 |
| JP | 3983139 B2 | | 9/2007 |
| JP | 2008181822 A | | 8/2008 |
| JP | 2019508838 A | | 3/2019 |
| JP | 2020-520063 A | | 7/2020 |
| KR | 10-2006-0115202 A | | 11/2006 |
| KR | 10-2014-0039451 A | | 4/2014 |
| KR | 10-2015-0021272 A | | 3/2015 |
| KR | 10-2015-0028073 A | | 3/2015 |
| KR | 10-1715695 B1 | | 3/2017 |
| KR | 10-2017-0139305 A | | 12/2017 |
| KR | 10-2018-0000115 A | | 1/2018 |
| KR | 10-2018-0064221 A1 | | 6/2018 |
| KR | 10-2019-0093443 A | | 8/2019 |
| KR | 10-2085343 B1 | | 3/2020 |
| KR | 10-2118549 B1 | | 6/2020 |
| WO | WO2018096926 A1 | | 5/2018 |

OTHER PUBLICATIONS

International Search Report and Written Opinion issued in corresponding International Patent Application No. PCT/KR2021/010080, dated Nov. 19, 2021.

European Search Report dated May 14, 2024 issued in corresponding European Patent Application No. 21853631.6.

First Office Action dated Mar. 25, 2025, issued in corresponding Japanese Patent Application No. 2022-539035.

* cited by examiner

BATTERY PACK HAVING CURRENT BLOCKING DEVICE USING BIMETAL AND OPERATING METHOD THEREOF

TECHNICAL FIELD

The present disclosure relates to a battery pack including a current breaking device using bimetal and an operation method thereof, and more particularly, to a battery pack including a current breaking device using bimetal, which is capable of quickly restoring a connection of a battery cell with surroundings when a state of the battery cell, which is separated from the surroundings due to an abnormal state thereof, is recovered, and an operation method thereof.

BACKGROUND ART

A large capacity battery pack, in which a plurality of battery cells are grouped and electrically connected, is essentially used to meet an output and a capacity required from a large sized electronic device such as an electric vehicle. The battery pack includes a bus bar made of a metal plate material allowing the plurality of battery cells to be electrically connected.

Here, when abnormal state is generated in even one of the plurality of battery cells, the rest battery cells, which normally operate, may unstably operate. Thus, various current breaking structures are provided between the bus bar and the battery cell in a process of configuring the large capacity battery pack by grouping the plurality of battery cells.

For example, the patent document 1 below discloses a metal member that is a current breaking structure formed to be cut at a high temperature. The metal member is provided between the bus bar and an electrode terminal of the battery cell and cut to mechanically separate the bus bar from the battery cell in an abnormal state when a temperature rapidly increases as the abnormal state is generated in the battery cell.

However, this conventional current breaking structure may not be reused. For example, although a state of the battery cell is recovered after a predetermined time elapses, the recovered battery cell may be reused only when the battery pack is opened to replace the cut metal member.

The background technology of the present disclosure is disclosed in the patent document below.

(Patent document 1) KR10-2018-0064221 A

DISCLOSURE OF THE INVENTION

Technical Problem

The present disclosure provides a reusable battery pack including a current breaking device using bimetal and an operation method thereof.

The present disclosure also provides a battery pack including a current breaking device using bimetal, which is capable of quickly restoring a connection with surroundings when a state of a battery cell separated from the surroundings due to an abnormal state thereof is recovered, and an operation method thereof.

Technical Solution

In accordance with an exemplary embodiment, a battery pack includes: a pack case; a plurality of cylindrical battery cells disposed in the pack case; and a current breaking device disposed in the pack case to connect the plurality of cylindrical battery cells and having a portion made of bimetal. Here, the current breaking device includes a fixed end contacting an electrode terminal of the cylindrical battery cell, a free end contacting an electrode terminal of the surrounding cylindrical battery cell, and a flexible member configured to elastically press the free end toward the surrounding cylindrical battery cell. Also, as the free end is fixed to the bimetal, contact between the free end and the electrode terminal of the cylindrical battery cell is turned-on or turned-off according to a shape deformation of the bimetal.

The fixed end and the free end may be disposed opposite to each other in a direction in which the plurality of cylindrical battery cells are arranged, and the flexible member and the free end may be disposed opposite to each other in a direction crossing the direction in which the plurality of cylindrical battery cells are arranged.

The fixed end may have a surface attached, by welding, to the electrode terminal of the cylindrical battery cell, and the free end may have a surface contacting, by elastically pressed, the electrode terminal of the surrounding cylindrical battery cell.

The bimetal portion of the current breaking device may be disposed between the plurality of cylindrical battery cells and an inner surface of the pack case so that a portion that is unbent by heat faces the cylindrical battery cell and the surrounding cylindrical battery cell, and a portion that is bent by heat faces the inner surface of the pack case, the fixed end and the free end may be disposed on the portion that is unbent by heat of the bimetal portion of the current breaking device, and the flexible member may be disposed on the portion that is bent by heat of the bimetal portion.

The current breaking device may include: a bus bar made of a plurality of materials that are expandable and contractible by heat and disposed above the surrounding cylindrical battery cell; a fixed end extending from one side of the bus bar and attached to the electrode terminal of the cylindrical battery cell; a free end extending from the other side, which is opposite to the one side, of the bus bar and contacting the electrode terminal of the surrounding cylindrical battery cell; and a flexible member configured to support the other side of the bus bar to a top surface of the pack case between the bus bar and the top surface of the pack case.

The bus bar may include an upper layer and a lower layer, which have different thermal expansion coefficients and are made of bimetal, the lower layer may have a thermal expansion coefficient greater than that of the upper layer, the fixed end and the free end may each extend downward from the lower layer and be spaced apart from each other in a horizontal direction, and the flexible member may be supported by the upper layer so that the flexible member is spaced upward from the free end.

The flexible member may include an elastic spring having an elastic force less than an expansion force of the bus bar.

The current breaking device may further include a transfer member disposed to thermally connect at least one of the bus bar, the fixed end, and the free end with the surrounding cylindrical battery cell.

In accordance with another exemplary embodiment, a method for operating a battery pack includes: connecting an electrode terminal of a cylindrical battery cell and an electrode terminal of a surrounding cylindrical battery cell in a pack case to a fixed end and a free end, respectively; spacing the free end apart from the surrounding cylindrical battery cell by bending a bimetal portion of the current breaking device when heat having a predetermined value or more is transferred from one of the cylindrical battery cell and the surrounding cylindrical battery cell; and restoring a connection between the free end and the surrounding cylindrical battery cell by restoring the bimetal portion when heat transferred to the bimetal portion is dissipated.

The spacing of the free end may include bending the bimetal portion in a direction away from the electrode terminal of the surrounding cylindrical battery cell with respect to the fixed end.

The spacing of the free end may include contracting the flexible member connected with the bimetal portion by using the bending.

The restoring of the connection may include elastically pressing a bent portion of the bimetal portion and pressing the free end, which is supported by the bent portion, toward the electrode terminal of the surrounding cylindrical battery cell.

Advantageous Effects

According to the exemplary embodiment, the current breaking device may be expanded in shape as the heat generated from the battery cell, in which the temperature increases due to the abnormal state thereof is transferred, to separate the corresponding battery cell from the surroundings and connect the corresponding battery cell with the surroundings when the heat is dissipated.

Also, as the portion having the expandable and contractible shape is the current breaking device is elastically pressed, the current breaking device may closely contact the electrode terminal of the battery cell by using all of the restoration force caused by the shape contraction when the heat is dissipated and the load caused by the elastic pressing and stably connect the corresponding battery cell with the surroundings.

Thus, the current breaking device may be quickly spaced apart from the battery cell in which the temperature increases due to the abnormal state or the surrounding battery cell connected with the corresponding battery cell and stably re-connect the corresponding battery cell and the surrounding battery cell when the temperature decreases as the state of the corresponding battery cell is restored.

Therefore, although the battery pack including the abnormal battery cell is not disassembled, the corresponding battery cell and the current breaking device connected thereto may be reused when the abnormal state of the corresponding battery cell is resolved.

MODE FOR CARRYING OUT THE INVENTION

Figure 1:
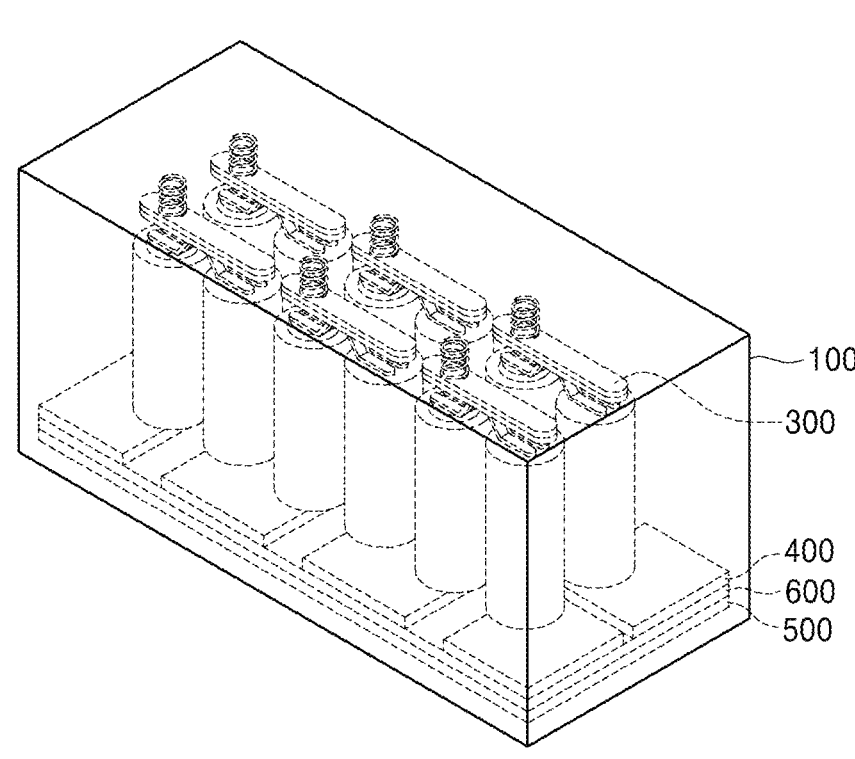
FIG. 1 is a view illustrating a battery pack in accordance with an exemplary embodiment.

Hereinafter, embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration, and parts irrelevant to the description are omitted in order to clearly describe the present invention. Like reference numerals refer to like elements throughout.

Hereinafter, a battery pack having a current breaking device using bimetal and an operation method thereof in accordance with an exemplary embodiment will be described in detail with reference to the drawings.

1. Battery Pack in Accordance with an Exemplary Embodiment

FIG. 1 is a view illustrating a battery pack in accordance with an exemplary embodiment. The battery pack in accordance with an exemplary embodiment will be described with reference to FIG. 1.

The battery pack in accordance with an exemplary embodiment, which is a battery pack having a current breaking device using bimetal, includes a pack case 100, a plurality of cylindrical battery cells 200 provided in the pack case 100, and a current breaking device 300 disposed in the pack case 100 to connect the plurality of cylindrical battery cells 200 and having a portion made of the bimetal.

Also, the battery pack in accordance with an exemplary embodiment may include: a connection member 400 made of a conductive material and disposed in the pack case 100 to connect the plurality of cylindrical battery cells 200 at a side opposite to the current breaking device 300; a cooling member 500 thermally connected with the plurality of cylindrical battery cells 200 through the connection member 400; a thermal interface material 600 inserted between the cooling member 500 and the connection member 400 for smooth heat transfer; and a cell holder (not shown) for fixing the plurality of cylindrical battery cells 200 in the pack case 100.

1.1. Pack Case 100

The pack case 100 may have an inner space to accommodate the plurality of cylindrical battery cells 200 therein. The pack case 100 may have a rectangular cylinder shape. Alternatively, the pack case 100 may have various shapes.

1.2. a Plurality of Cylindrical Battery Cells 200

The plurality of cylindrical battery cells 200 may be provided in the pack case 100 of the battery pack to increase an output and a capacity of the battery pack. The plurality of cylindrical battery cells 200 may include a secondary battery cell.

The secondary battery cell may be formed such that an electrode assembly in which as a separation membrane is disposed between a positive electrode plate with a positive electrode tab attached and a negative electrode plate with a negative electrode tab attached, the positive electrode plate, the negative electrode plate, and the separation membrane are wound in the form of jelly roll is accommodated in the cell case. An electrode terminal may be formed at each of one side and the other side, which is opposite to the one side, of the secondary battery cell. Here, when a positive electrode terminal is formed at the one side of the secondary battery cell, a negative electrode terminal may be formed at the other side opposite to the one side.

The plurality of cylindrical battery cells 200 may be arranged in a row direction and a column direction. Here, the cylindrical battery cells may be accommodated in the pack case 100 such that the cylindrical battery cells arranged in the row direction are arranged so that the positive electrode terminal and the negative electrode terminal alternately face upward, and the cylindrical battery cells arranged in the column direction are arranged so that the same kind of electrode terminals face upward. The plurality of cylindrical battery cells 200 are serial-connected in the row direction and parallel-connected in the column direction. Here, the row direction may be referred to as a left-right direction, and the column direction may be referred to as a front-back direction. Both of the left-right direction and the front-back direction may be generally referred to as a horizontal direction.

1.3. Current Breaking Device 300

Figure 2:
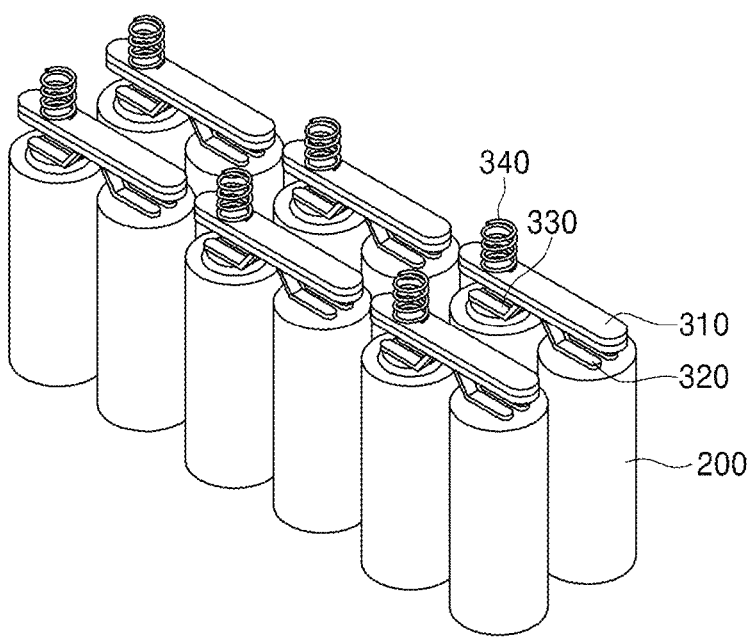
FIG. 2 is a view illustrating a current breaking device in accordance with an exemplary embodiment.

FIG. 2 is a view illustrating the current breaking device in accordance with an exemplary embodiment. The current breaking device in accordance with an exemplary embodiment will be described with reference to FIG. 2.

The current breaking device 300 may be provided for electrically connecting the plurality of cylindrical battery cells 200 and disposed above the plurality of cylindrical battery cells 200. As one current breaking device 300 is provided per two cylindrical battery cells arranged in the left-right direction, a plurality of current breaking devices 300 may be provided in the pack case 100.

The current breaking device 300 may have a portion made of bimetal, and when a temperature increases as an abnormal state occurs in at least one of the two cylindrical battery cells connected with the corresponding current breaking device, the current breaking device may be spaced apart from one of the two cylindrical battery cells by deforming a bimetal portion to break an electrical connection therebetween. Alternatively, when a temperature decreases as a state of the two cylindrical battery cells connected with the corresponding current breaking device is recovered, the electrical connection between the two cylindrical battery cells may be recovered by restoring the bimetal portion.

1.4. Detailed Structure of Current Breaking Device 300

Figure 3:
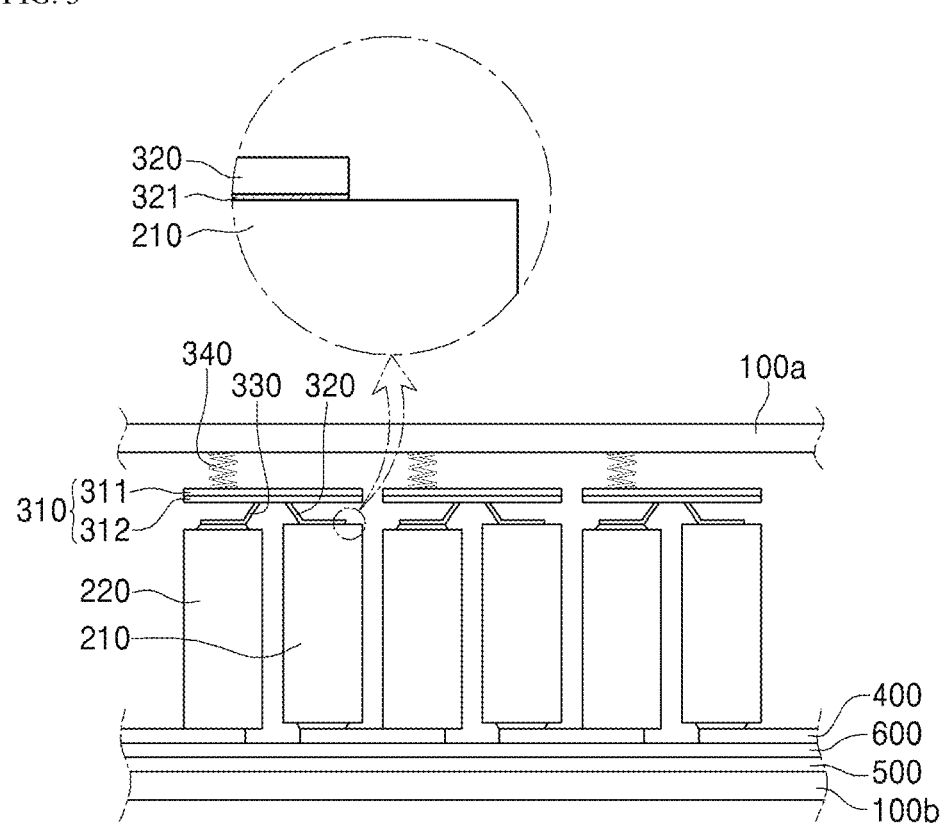
FIG. 3 is a view illustrating the inside of the battery pack in accordance with an exemplary embodiment.

FIG. 3 is a view illustrating the inside of the battery pack in accordance with an exemplary embodiment.

Referring to FIG. 3, the current breaking device 300 includes: a fixed end 320 attached to an electrode terminal of a cylindrical battery cell 210; a free end 330 contacting an electrode terminal of a surrounding cylindrical battery cell 220; and a flexible member 430 elastically pressing the free end 330 toward the surrounding cylindrical battery cell 220.

Here, the fixed end 320 and the free end 330 may be disposed opposite to each other in a direction in which the plurality of cylindrical battery cells 200 are arranged, and the flexible member 340 and the free end 330 may be opposite to each other in a direction crossing the direction in which the plurality of cylindrical battery cells 200 are arranged. That is, the fixed end 320 and the free end 330 may be opposite to each other in a horizontal direction, and the flexible member 340 and the free end 330 may be opposite to each other in a vertical direction crossing the horizontal direction.

The fixed end 320 may be referred to as a "fixed lead". The fixed end 320 may include a surface 321 attached to the electrode terminal of the cylindrical battery cell by welding. The free end 330 may be referred to as a "free lead". The free end 330 may include a surface contacting the electrode terminal of the surrounding cylindrical battery cell 220 by elastically pressing. Here, when the bimetal portion is bent by thermal deformation, a bending force of the bimetal portion may be greater than a force of elastically pressing the free end 330. Also, when the bimetal portion is restored as heat is dissipated therefrom, the elastically pressing may elastically press the free end 330 downward together with a restoration force of the bimetal portion.

The bimetal portion may include a bus bar 310. In the bus bar 310, a lower layer 312 that is unbent by heat may face the cylindrical battery cell 210 and the surrounding cylindrical battery cell 220, an upper layer 311 that is bent by heat may be disposed between the plurality of cylindrical battery cells 200 and an inner surface of an upper wall 100*a* of the pack case 100 to face the inner surface of the upper wall 100*a* of the pack case 100, and the lower layer 312 may be unbent, and the upper layer 311 may be bent when heat is transferred so that a portion at which the free end 330 is disposed ascends in an upward direction. Here, the fixed end 320 and the free end 330 may be provided on the lower layer 312 that is unbent by heat of the bus bar 310, and the flexible member 340 may be provided on the upper layer 311 that is bent by the heat of the bus bar 310. Hereinafter, the current breaking device 300 will be described in more detail.

The current breaking device 300 may include: the bus bar 310 made of a plurality of materials that are expandable and contractible by heat and spaced upward from the cylindrical battery cell 210 and the surrounding cylindrical battery cell 220; the fixed end 320 extending downward from one side of the bus bar 310 and attached to the electrode terminal of the cylindrical battery cell 210; the free end 330 extending downward from the other side of the bus bar 310, which is opposite to the one side, and contacting the electrode terminal of the surrounding cylindrical battery cell 220; and the flexible member 340 supporting the other side of the bus bar 310 to a top surface of the pack case 100 between the bus bar 310 and the top surface of the pack case 100, e.g., the inner surface of the upper wall 100*a*.

For example, the bus bar 310 may extend in the left-right direction, and an extended width may correspond to a width occupied by two cylindrical battery cells. Here, the feature of corresponding represents that the widths are equal to each other, or one width is greater or less by a predetermined size than another width. The width of the bus bar in the front-back direction may correspond to a width occupied by one cylindrical battery cell.

Since the bus bar 310 includes the upper layer 311 and the lower layer 312, which have different thermal expansion coefficients, the bus bar 310 may be made of bimetal. Here, the lower layer 312 may have a thermal expansion coefficient greater than that of the upper layer 311. Thus, when the bus bar 310 is heated, and the upper layer 311 and the lower layer 312 are expanded, as the lower layer 312 is more expanded than the upper layer 311, the lower layer 312 may seem to be relatively expanded, and the upper layer 311 may seem to be relatively contracted.

The fixed end 320 may extend downward from the lower layer 312 and have a lower portion extending in the left-right direction and an upper portion extending inclinedly in the vertical direction. Also, the fixed end 320 has an upper end supported by a bottom surface of the lower layer 312 of the bus bar 310. Here, a lower portion of the fixed end 320 may be welded and fixed to the electrode terminal of the cylindrical battery cell 210.

The free end 330 may be spaced apart from the fixed end 320 in the horizontal direction, i.e., the left-right direction, and extend downward from the lower layer 312. The free end 330 may have an upper portion extending inclinedly in the vertical direction and a lower portion extending in the left-right direction. Also, the free end 330 may have an upper end supported by the bottom surface of the lower layer 312 and a lower end contacting the terminal electrode of the surrounding cylindrical battery cell 220. A current may flow from the electrode terminal disposed at an upper portion of the surrounding cylindrical battery cell 220 to the terminal electrode disposed at an upper portion of the cylindrical battery cell 210 through the free end 330 contacting the electrode terminal and the bus bar 310.

Here, when heat is generated by an abnormal state of at least one of the cylindrical battery cell 210 and the surrounding cylindrical battery cell 220, the generated heat may be transferred to the bus bar 310 to bend the bus bar 310, and the free end 330 may ascend to break the flow of the current.

That is, as a predetermined portion of the bus bar 310 is bent upward by heat, the free end 330 connected to the lower portion of the bus bar 310 ascends to break a connection between the battery cell 220 and the free end 330 connected thereto. The electrical connection between the free end 330 and the battery cell 220 may be turned-on or turned-off according to a state of heat applied to the free end 330 and the bus bar 310 while the fixed end 320 is always connected to the battery cell 210 adjacent thereto.

Here, the flexible member 340 may include an elastic spring having an elastic force less than an expansion force of the bus bar 310 when the bus bar 310 is thermally deformed. Thus, the bus bar 310 may be smoothly bent by heat while contracting the flexible member 340.

Also, when a state of the cylindrical cell in the abnormal state is recovered, a shape of the bus bar 310 may be restored, and the free end 330 may descend to contact the terminal electrode disposed at the upper portion of the surrounding cylindrical battery cell 220, thereby recovering the flow of the current. Here, the flexible member 340 may increase a restoration force of the bus bar 310 so that the free end 330 contacts the terminal electrode of the surrounding cylindrical battery cell 220.

As described above, the free end 320 may be spaced apart from the terminal electrode of the surrounding cylindrical battery cell 220 according to expansion and bending of the bus bar 310 and contact the terminal electrode of the surrounding cylindrical battery cell 220 by a load caused by elastic pressing of the flexible member 340 and the restoration force caused by the contraction of the bus bar 310.

That is, the flexible member 340 may have an elastic force that is set so that the free end 330 assists all of the bending and relaxation of the bus bar 310 that is bent by heat.

Here, the flexible member 340 may be supported by the upper layer 311 so that the flexible member 340 is disposed above the free end 330. That is, the flexible member 340 may have an upper end contact-supported by the top surface of the pack case 100 and a lower end supported by the upper layer 311 above the free end 330. Thus, the flexible member 340 may press downward the free end 330 through the bus bar 310, and thus the contact between the free end 330 and the terminal electrode disposed at the upper portion of the surrounding cylindrical battery cell 220 may be stably maintained. Also, at least one of the upper end and the lower end of the flexible member 340 may be electrically insulated.

1.5. Connection Member 400

The connection member 400 may be made of a metal plate material. The connection member 400 may be provided in plurality to electrically connect the plurality of cylindrical battery cells 200. Here, the connection members 400 may be arranged to serial-connect the cylindrical battery cells arranged in the row direction and parallel-connect the cylindrical battery cells arranged in the column direction.

For example, when the current breaking device 300 connects the cylindrical battery cell 210 and the surrounding cylindrical battery cell 220, the current breaking device 300 may be arranged to connect a preceded cylindrical battery cell of the cylindrical battery cell 210 with the cylindrical battery cell 210 and to connect a following cylindrical battery cell of the surrounding cylindrical battery cell 220 with the surrounding cylindrical battery cell 220 in a direction of the flow of the current instead of connecting the cylindrical battery cell 210 and the surrounding cylindrical battery cell 220.

1.6. Cooling Member 500 and Thermal Interface Material 600

The cooling member 500 may include a heat sink. The cooling member 500 may be installed on a bottom 100b of the pack case 100 to dissipate heat to the outside of the pack case 100.

The thermal interface material (TMI) 600 may allow the cooling member 500 to thermally contact the connection member 400. Thus, heat generated from the plurality of cylindrical battery cells 200 may be transferred to the thermal interface material 600 through the connection member 300 and dissipated to the outside of the pack case 100 through the cooling member 500.

1.7. Cell Holder

A cell holder (not shown) may contact outer circumferential surfaces of the plurality of cylindrical battery cells 200 to fix the plurality of cylindrical battery cells 200 in the pack case 100.

Figure 4:
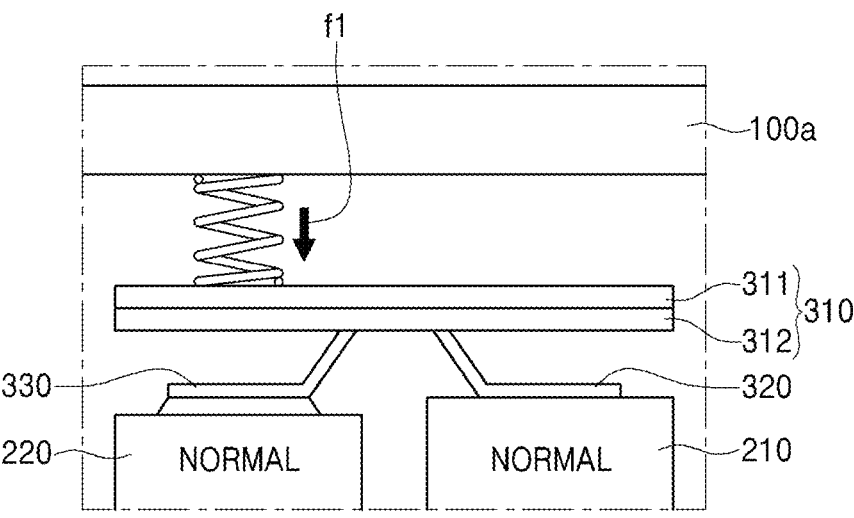
FIG. 4 is a view illustrating a state in which the current breaking device allows a current to flow in accordance with an exemplary embodiment.

2. Method for Operating Battery Pack in Accordance with an Exemplary Embodiment FIG. 4 is a view illustrating a state in which the current breaking device allows a current to flow in accordance with an exemplary embodiment, and FIG. 4 is a view illustrating a state in which the current breaking device breaks a current in accordance with an exemplary embodiment.

Hereinafter, the method for operating the battery pack in accordance with an exemplary embodiment will be described with reference to FIGS. 4 and 5.

The method for operating the battery pack in accordance with an exemplary embodiment may include following processes.

2.1. A process of connecting the electrode terminal of the cylindrical battery cell 210 and the electrode terminal of the surrounding cylindrical battery cell 220 in the pack case 100 to the fixed end 320 and the free end 330 of the current breaking device electrically connect the cylindrical battery cell 210 and the surrounding cylindrical battery cell 220 through the current breaking device. Here, the negative electrode terminal disposed at the upper portion of the cylindrical battery cell 210 may be connected to the fixed end 320 of the current breaking device by welding, and the positive electrode terminal disposed at the upper portion of the surrounding cylindrical battery cell 220 may be connected to the free end 330 of the current breaking device.

In this process, as illustrated in FIG. 4, the flexible member 340 may apply a force, e.g., an elastic force f1, in a downward direction to elastically press the free end 330 through the bus bar 310. That is, the positive electrode terminal disposed at the upper portion of the surrounding cylindrical battery cell 220 and the free end may closely contact each other. Thus, the electrical connection between the cylindrical battery cell 210 and the surrounding cylindrical battery cell 220 may be stably maintained.

When the abnormal state is generated in one of the cylindrical battery cells while the battery pack operates, e.g., while high rate charging and discharging is performed, high temperature heat may be generated, and this generated heat may affect operations of other cylindrical battery cells disposed therearound. Thus, the cylindrical battery cell having a temperature that rapidly increases as the abnormal state is generated has to be quickly electrically separated from the surroundings. This may be implemented through a following a process.

2.2. As illustrated in FIG. 5, a process of spacing the free end 330 apart from the terminal electrode of the surrounding cylindrical battery cell 220 by bending the bimetal portion of the current breaking device when heat T is transferred from one of the cylindrical battery cell and the surrounding cylindrical battery cell bends the bimetal portion, i.e., the bus bar 310, in a direction away from the electrode terminal of the surrounding cylindrical battery cell 220 with respect to the fixed end 320. Here, since a bending force f2 is greater than the elastic force of the flexible member 340, the flexible member connected 310 may be contracted by using bending of the bus bar 310. Thus, the free end 330 may be easily spaced apart from the electrode terminal of the surrounding cylindrical battery cell 220. Accordingly, electrical connections between the battery cells may be broken.

Also, a state of the cylindrical battery cell in which an electrical connection with surroundings is broken due to the abnormal state may be restored after a predetermined time elapses. Here, the cylindrical battery cell may be electrically connected with the surroundings by performing a following process.

2.3. When the heat transferred to the bus bar 310 that is the bimetal portion is dissipated, the cylindrical battery cell in a restored state is electrically connected with the surroundings by a process of restoring the bus bar 310 to restore the connection between the free end 330 and the electrode terminal of the surrounding cylindrical battery cell 220. Here, a bent portion of the bus bar 310 is elastically pressed by expanding the flexible member 340, and the free end 330 supported by the bent portion is pressed toward the electrode terminal of the surrounding cylindrical battery cell 220.

Thereafter, the connection between the free end 330 and the electrode terminal of the surrounding cylindrical battery cell 220 may be stably maintained while the flexible member 340 of the current breaking device 300 elastically presses the bus bar 310.

3. Battery Pack and Operation Method Thereof in Accordance with a Modified Example FIG. 6 is a view illustrating a state in which the current breaking device breaks a current in accordance with a modified example. The battery pack and an operation method thereof in accordance with a modified example will be described with reference to FIGS. 5 and 6.

Figure 5:
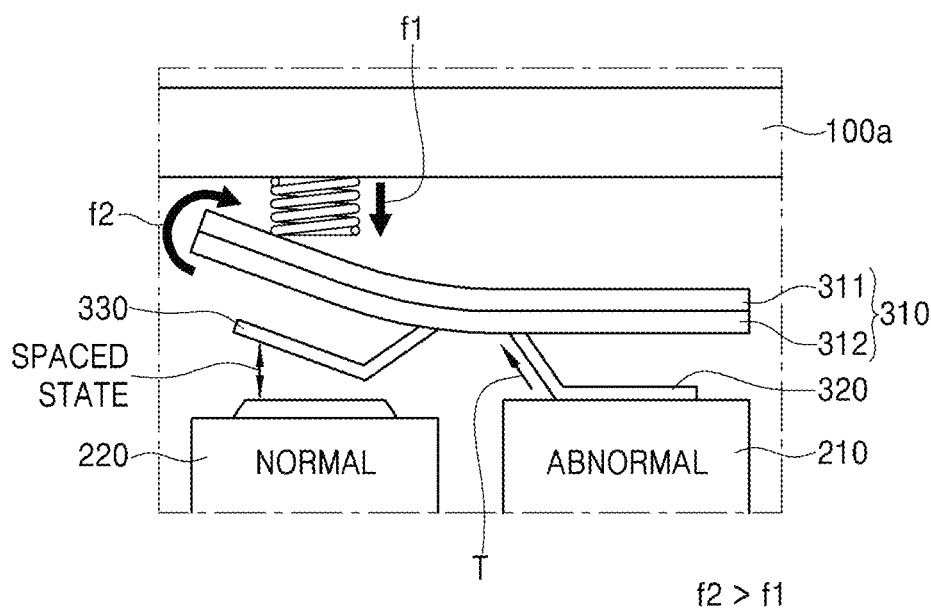
FIG. 5 is a view illustrating a state in which the current breaking device breaks a current in accordance with an exemplary embodiment.
Figure 6:
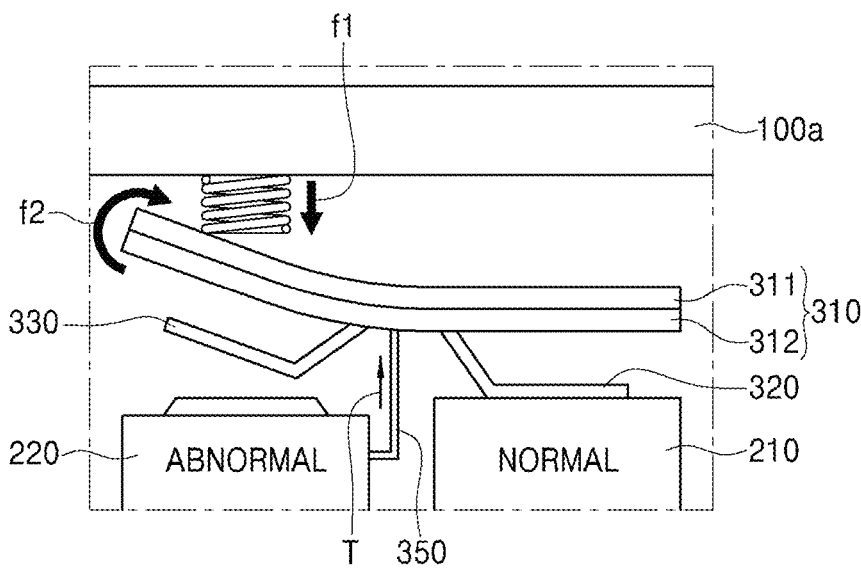
FIG. 6 is a view illustrating a state in which a current breaking device breaks a current in accordance with a modified example.

Referring to FIG. 5, when heat is generated from the cylindrical battery cell 210 attached with the fixed end 320, and the free end 330 of the current breaking device is spaced apart from the surrounding cylindrical battery cell 220 due to the generated heat, as the heat is continuously transferred to the bus bar 310 until the abnormal state of the cylindrical battery cell 210 is resolved, a bent state of the bus bar 310 may be smoothly maintained.

Also, as heat is generated from the surrounding cylindrical battery cell 220 contacting the free end 330, the heat generated from the surrounding cylindrical battery cell 220 may be transferred to the bus bar 310 by heat convection and heat radiation in the bent state of the bus bar 310.

Thus, referring to FIG. 6, the current breaking device 300 of the battery pack in accordance with a modified example may further include a transfer member 350 for thermally connecting at least one of the bus bar 310, the fixed end 320, and the free end 330 with the surrounding cylindrical battery cell 220. For example, the transfer member 350 may be disposed in the pack case 100 to connect the bus bar 310 with an outer surface of the surrounding cylindrical battery cell 220.

Thus, the operation method of the battery pack in accordance with a modified example may further include a process of exchanging heat through a heat transfer path between the surrounding cylindrical battery cell 220 and the bus bar 310 after the process of spacing the free end 330 apart from the electrode terminal of the surrounding cylindrical battery cell 220. In this process, the heat generated from the surrounding cylindrical battery cell 220 may be further smoothly transferred to the bus bar 310.

Although the deposition apparatus and method have been described with reference to the specific embodiments, they are not limited thereto. Further, the above contents just illustrate and describe preferred embodiments of the present invention and the present invention may be used under various combinations, changes, and environments. Therefore, it will be readily understood by those skilled in the art that various modifications and changes can be made thereto without departing from the spirit and scope of the present invention defined by the appended claims.

DESCRIPTION OF SYMBOLS

100: Pack case
200: A plurality of cylindrical battery cells
210: Cylindrical battery cell
220: Surrounding cylindrical battery cell
300: Current breaking device
310: Bus bar
320: Fixed end
330: Free end
340: Flexible member
400: Connection member

What is claimed is:

1. A battery pack comprising:
a pack case;
a plurality of cylindrical battery cells disposed in the pack case; and
a current breaking device disposed in the pack case to connect the plurality of cylindrical battery cells and having a portion including a bimetal,
wherein the current breaking device comprises a fixed end contacting an electrode terminal of the cylindrical battery cell, a free end contacting an electrode terminal of the surrounding cylindrical battery cell, and a flexible member configured to elastically press the free end toward the surrounding cylindrical battery cell,
wherein the free end is fixed to the bimetal such that contact between the free end and the electrode terminal of the cylindrical battery cell is turned-on or turned-off according to a shape deformation of the bimetal,
wherein the fixed end and the free end are disposed opposite to each other in a direction in which the plurality of cylindrical battery cells are arranged, and wherein the flexible member and the free end are disposed opposite to each other in a direction crossing the direction in which the plurality of cylindrical battery cells are arranged.

2. The battery pack of claim 1, wherein the fixed end has a surface attached to the electrode terminal of the cylindrical battery cell, and wherein the free end has a surface contacting, by elastically pressed, the electrode terminal of the surrounding cylindrical battery cell.

3. The battery pack of claim 2, wherein the bimetal portion of the current breaking device is disposed between the plurality of cylindrical battery cells and an inner surface of the pack case so that a portion that is configured to be unbent by heat faces the cylindrical battery cell and the surrounding cylindrical battery cell, and a portion that is configured to be bent by heat faces the inner surface of the pack case, wherein the fixed end and the free end are disposed on the portion that is unbent by heat of the bimetal portion of the current breaking device, and wherein the flexible member is disposed on the portion that is bent by heat of the bimetal portion.

4. The battery pack of claim 1, wherein the current breaking device comprises:

a bus bar including a plurality of materials that are expandable and contractible by heat and disposed above the surrounding cylindrical battery cell;

a fixed end extending from one side of the bus bar and attached to the electrode terminal of the cylindrical battery cell;

a free end extending from another side, which is opposite to the one side, of the bus bar and contacting the electrode terminal of the surrounding cylindrical battery cell; and a flexible member configured to support the other side of the bus bar to a top surface of the pack case between the bus bar and the top surface of the pack case.

5. The battery pack of claim 4, wherein the bus bar comprises an upper layer and a lower layer, which have different thermal expansion coefficients and include a bimetal, wherein the lower layer has a thermal expansion coefficient greater than that of the upper layer, wherein the fixed end and the free end each extend downward from the lower layer and are spaced apart from each other in a horizontal direction, and wherein the flexible member is supported by the upper layer so that the flexible member is spaced upward from the free end.

6. The battery pack of claim 4, wherein the flexible member comprises an elastic spring having an elastic force less than an expansion force of the bus bar.

7. The battery pack of claim 4, wherein the current breaking device further comprises a transfer member disposed to thermally connect at least one of the bus bar, the fixed end, and the free end with the surrounding cylindrical battery cell.

8. A method for operating a battery pack, comprising:

connecting an electrode terminal of a cylindrical battery cell and an electrode terminal of a surrounding cylindrical battery cell in a pack case to a fixed end and a free end, respectively, of a breaking device, the breaking device including a flexible member configured to elastically press the free end toward the surrounding cylindrical battery cell;

separating the free end from the surrounding cylindrical battery cell by bending a bimetal portion of the current breaking device when heat having a predetermined value or more is transferred from one of the cylindrical battery cell and the surrounding cylindrical battery cell; and restoring a connection between the free end and the surrounding cylindrical battery cell by restoring the bimetal portion when heat transferred to the bimetal portion is dissipated wherein the separating of the free end comprises bending the bimetal portion in a direction away from the electrode terminal of the surrounding cylindrical battery cell with respect to the fixed end, and wherein the separating of the free end comprises contracting the flexible member connected with the bimetal portion by the bending.

9. The method of claim 2, wherein the restoring of the connection comprises elastically pressing a bent portion of the bimetal portion and pressing the free end, which is supported by the bent portion, toward the electrode terminal of the surrounding cylindrical battery cell.

10. A battery pack comprising:

a pack case;

a plurality of cylindrical battery cells disposed in the pack case; and a current breaking device disposed in the pack case to connect the plurality of cylindrical battery cells and having a portion including a bimetal, wherein the current breaking device comprises a fixed end contacting an electrode terminal of the cylindrical battery cell, a free end contacting an electrode terminal of the surrounding cylindrical battery cell, and a flexible member configured to elastically press the free end toward the surrounding cylindrical battery cell, wherein the free end is fixed to the bimetal such that contact between the free end and the electrode terminal of the cylindrical battery cell is turned-on or turned-off according to a shape deformation of the bimetal, and wherein the current breaking device comprises:

a bus bar including a plurality of materials that are expandable and contractible by heat and disposed above the surrounding cylindrical battery cell;

a fixed end extending from one side of the bus bar and attached to the electrode terminal of the cylindrical battery cell;

a free end extending from another side, which is opposite to the one side, of the bus bar and contacting the electrode terminal of the surrounding cylindrical battery cell; and a flexible member configured to support the other side of the bus bar to a top surface of the pack case between the bus bar and the top surface of the pack case.

11. The battery pack of claim 10, wherein the bus bar comprises an upper layer and a lower layer, which have different thermal expansion coefficients and include a bimetal, wherein the lower layer has a thermal expansion coefficient greater than that of the upper layer, wherein the fixed end and the free end each extend downward from the lower layer and are spaced apart from each other in a horizontal direction, and wherein the flexible member is supported by the upper layer so that the flexible member is spaced upward from the free end.

12. The battery pack of claim 10, wherein the flexible member comprises an elastic spring having an elastic force less than an expansion force of the bus bar.

13. The battery pack of claim 10, wherein the current breaking device further comprises a transfer member disposed to thermally connect at least one of the bus bar, the fixed end, and the free end with the surrounding cylindrical battery cell.

\* \* \* \* \*